C. E. ALLARD.
HEEL MAKING MACHINE.
APPLICATION FILED AUG. 5, 1913.

1,110,175.

Patented Sept. 8, 1914.
6 SHEETS—SHEET 3.

Witnesses
Frank Hough.
R. M. Smith.

Inventor
Charles E. Allard,
By Victor J. Evans
Attorney

UNITED STATES PATENT OFFICE.

CHARLES E. ALLARD, OF HAVERHILL, MASSACHUSETTS.

HEEL-MAKING MACHINE.

1,110,175.                 Specification of Letters Patent.       Patented Sept. 8, 1914.

Application filed August 5, 1913. Serial No. 783,106.

*To all whom it may concern:*

Be it known that I, CHARLES E. ALLARD, a citizen of the United States, residing at Haverhill, in the county of Essex and State of Massachusetts, have invented new and useful Improvements in Heel-Making Machines, of which the following is a specification.

This invention relates to heel making machines the broad object of the invention being to produce a machine for operating upon heels of shoes during the building up of the heel from any suitable number of lifts, so as to materially increase the output of the machine and proportionately reduce the expense of production of heels.

Under the system of building up heels at present in use, the operator builds up the heel in a small machine, then swings over the heel an arm with a cam lever attached which presses the heel down. Then with his foot he operates a treadle and drives a nail up into the heel after which he swings back the lever, removes the heel by hand and places it on a board. This operation is continued until the board is full of heels. The boards are removed and placed in a pile under a press and the press is screwed down tightly and the heels allowed to remain under pressure for twelve hours. Upon removal from the press the heels are placed in a drying room for about twenty-four hours and they are then ready to compress. This requires about thirty-six hours from the time the heel is pasted until it is ready to compress. With the aid of the direct pressure of each individual heel for about a minute or a minute and a half, as provided for in the present invention, the cement or paste is allowed to set and this enables the heels to be pasted in the forenoon and compressed in the afternoon. This not only effects a great saving of time but also does away entirely with the use of nails.

Under the present system of manufacturing heels, seven hundred pairs or fourteen hundred single heels constitute a good day's work in a factory of the average output. With the aid of the direct pressure machine contemplated in this invention, from three to five thousand single heels are produced in one day or three times as many as under the old system. Under the system now in use the operator is required to reach all over the bench for the lifts of which the heels are composed. There are different compartments for different sizes of lifts arranged around the bench. In the present machine a revolving lift holder is provided, the same being arranged within convenient reach of the operator who may readily turn the same by hand independently of any other part of the machine. This greatly expedites the building up of the heels and saves much physical effort on the part of the operator. The saving of nails alone is quite an item when it is considered that in a plant of medium output nearly three million nails are used in a year which equals over four thousand pounds at a cost of five cents per pound.

The machine hereinafter described, after being started, continues its operation through one complete cycle automatically and without any attention whatever on the part of the operator.

With the above and other objects in view, the invention consists in the construction, combination and arrangement of parts, as will hereinafter be more fully described, illustrated and claimed.

In the accompanying drawings.

Figure 1:
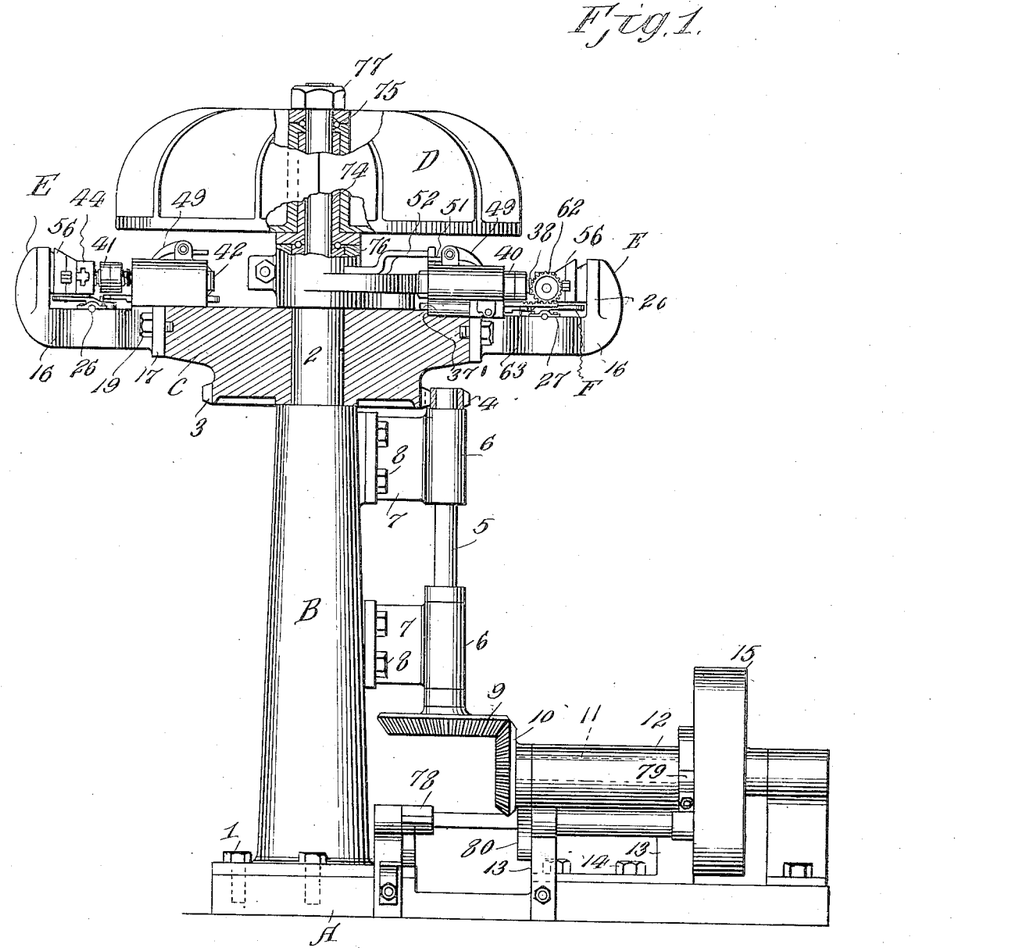
—Figure 1 is a front elevation of a heel making machine, the revolving turret head being shown in section.

Referring primarily to Fig. 1, the heel making machine contemplated in this invention is illustrated, in the preferred embodiment thereof, as embodying a supporting base A, a column or pedestal B secured to the base by cap screws 1 or their equivalent and extending upwardly to a suitable height, said column supporting a revoluble turret head C and a superimposed lift holder D which is rotatable independently of the head C.

The turret head C is journaled to turn on a vertical axis on a spindle 2 formed by reducing the upper end of the column B and the turret head is revolved by means of a gear wheel 3 having a fixed relation to the turret head and preferably fastened to the bottom thereof as shown in Fig. 1, said gear wheel 3 meshing with and being driven by a pinion 4 fast on the upper end of a turret operating shaft 5 extending vertically and journaled in bearings 6 formed on brackets 7 shown as secured to the column B by cap screws 8.

On the lower end of the shaft 5 is fastened a bevel gear wheel 9 which meshes with and is driven by another bevel gear wheel 10 fast on a driving shaft 11 journaled in bearings 12 supported at a suitable elevation by pillow blocks 13 shown as fastened to the base A by cap screws 14.

15 designates a band pulley by which motion is imparted to the driving shaft 11 for the purpose of actuating the entire mechanism of the machine as will hereinafter appear. It will be understood at this point, however, that the shaft 11 in revolving will impart rotary motion to the shaft 5 and through the gear wheels 3 and 4 to the turret head. It may also be stated at this point that the turret head C does not revolve continuously but an intermittent rotary movement is imparted thereto so as to enable said turret head to remain stationary for the desired length of time to enable the operator to build up a heel and place the same in one of the heel clamping units preparatory to the operation of the machine on said heel.

Figure 2:
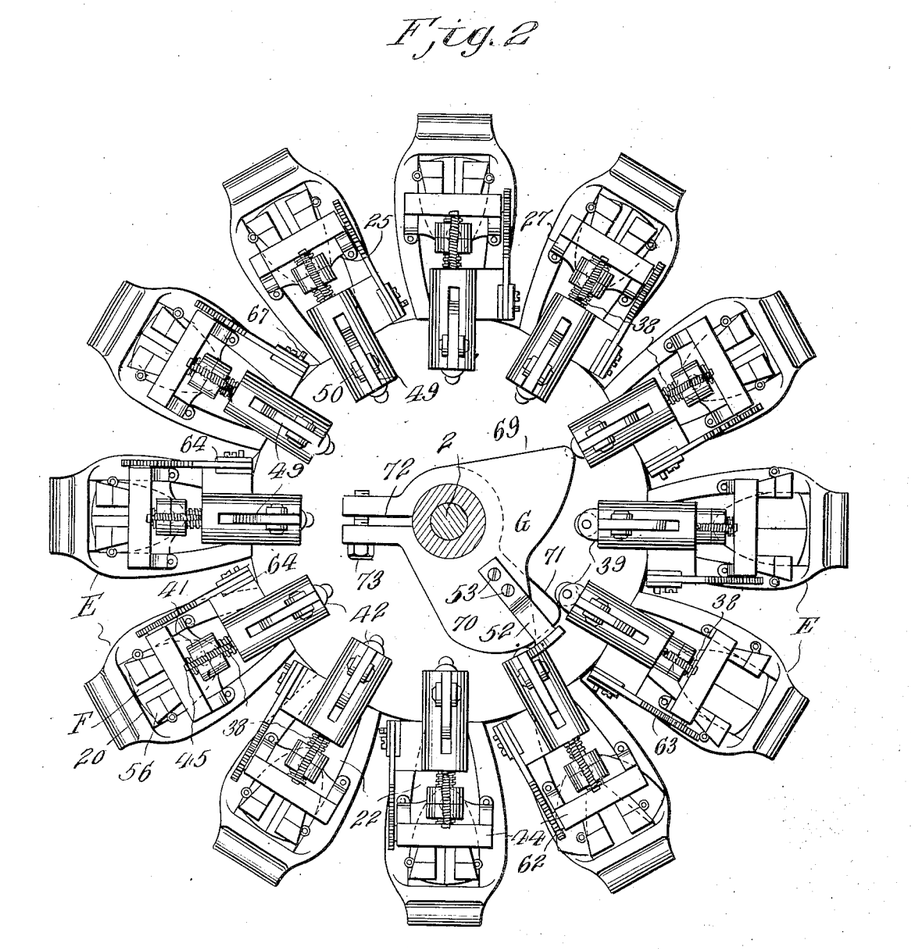
Fig. 2 is a plan view of the turret head, showing also the stationary cam and pawl or detent trip.

As shown in Figs. 1 and 2 the revoluble turret head C has secured along its outer margin or periphery a circular series of heel clamps or heel clamping units E, each of said units being identical with the rest so that it will be necessary only to describe one of said units in detail.

Figure 5:
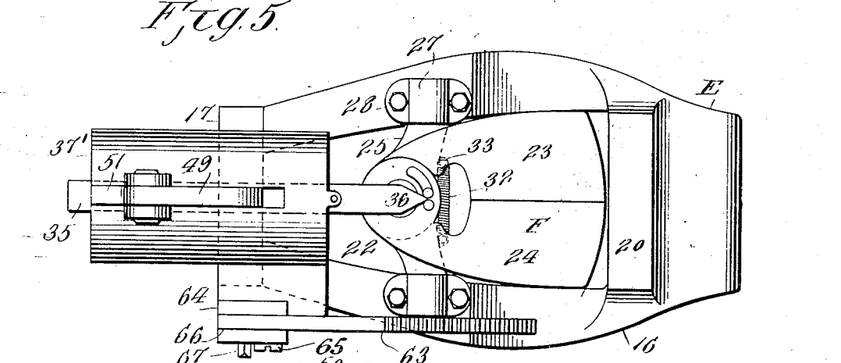
Fig. 5 is a plan view of the same omitting the plunger and the parts carried thereby.
Figure 6:
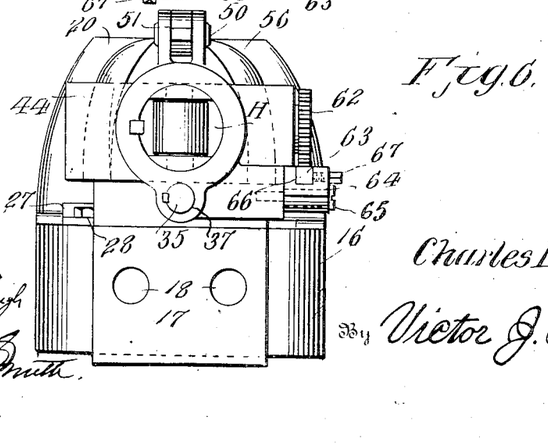
Fig. 6 is an inner end view of the same.
Figure 7:
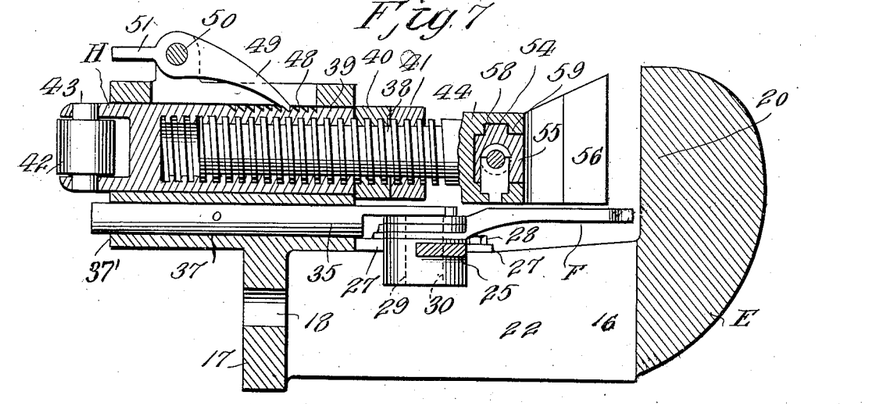
Fig. 7 is a vertical longitudinal section on an enlarged scale through one of the heel clamps or heel clamping units.
Figure 8:
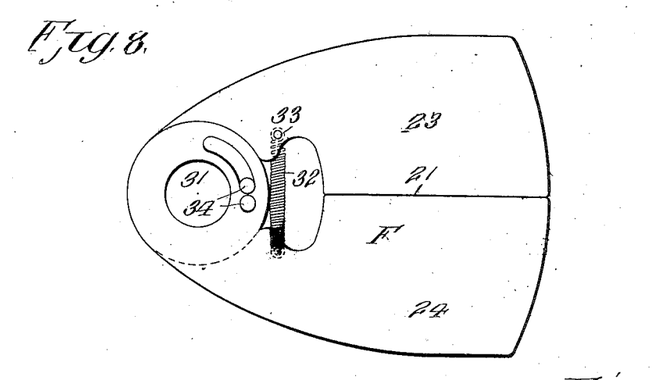
Fig. 8 is a plan view of one of the heel tables detached.
Figure 9:
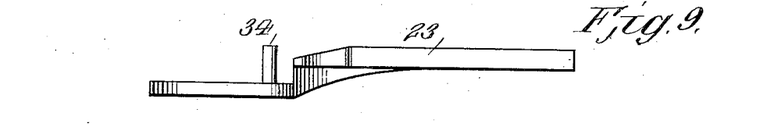
Fig. 9 is an edge elevation of one of the table sections.
Figure 10:
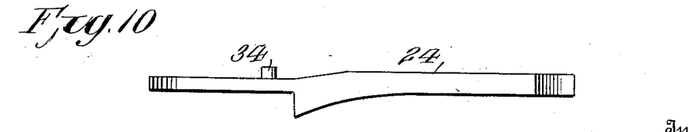
Fig. 10 is an edge view of the other table section.
Figure 11:
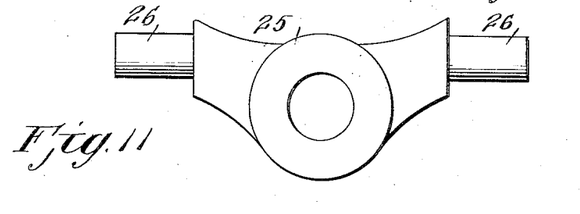
Fig. 11 is a plan view of the heel table support.

Referring now particularly to Figs. 4, 5, 6 and 7, it will be seen that each unit E comprises a body or frame member 16 having at its inner end a vertical flange 17 provided with one or more openings 18 adapted to receive a corresponding number of fastening devices 19 shown in the form of cap screws by means of which the body 16 of the unit is rigidly and firmly secured to the marginal edge of the turret head C. Adjacent to its outer end the heel clamp or unit E comprises a vertical transverse fixed abutment 20 against which the heel is pressed by the plunger hereinafter particularly described. Located in a plane near the bottom of the fixed abutment 20 is a heel supporting table F which as best illustrated in Figs. 5 and 8 is centrally divided along the line 21 thereby forming said table into two sections which as hereinafter described are adapted to be moved toward and away from each other and when spread apart or moved away from each other will permit the completed heel to drop into a receptacle placed beneath the line of sweep of all of the tables of the series of units.

The body 16 of the unit is centrally cut away or left open as shown at 22 and the table sections designated at 23 and 24 operate in a horizontal plane above the body 16 in releasing the heel as indicated. 25 designates a heel table support which as shown in Fig. 5 extends across the central opening 22 above referred to and has its opposite ends reduced as at 26 and secured to the oppositely lying portions of the body 16 by means of caps 27 fastened by cap screws 28 to the body 16. The support 25 is provided with a central opening 29 in which fits a fulcrum pin 30 which also passes through openings 31 in the table sections 23 and 24, said table sections turning about said fulcrum pin 30 as a center. The table sections are normally held together or in contact with each other along the dividing line 21 by means of a contractile spring 32 the opposite extremities of which are fastened at 33 to the table sections. The table sections 23 and 24 are provided on their upper sides with upwardly extending shoulders 34 shown in the form of pins or studs. One of said pins is fastened to each table section and when the table is closed as shown in Fig. 8, said shoulders 34 lie close together. In order to spread or open the table, I employ a spreader 35 having a wedge-shaped end portion or member 36 which, as shown in Fig. 5 is adapted to force its way between the shoulders 34, the result of which is to open the table sections or swing the same horizontally away from each other, thus permitting the previously supported heel to drop through the open center 22 of the clamping unit where it is caught in the underlying receptacle. The spreader 35 is shown in the form of a straight reciprocating bar fastened through a guide way 37 in the body 16 of the unit and projecting at its inner end beyond the inner face 37' of the unit frame where it is operated upon by a centrally located cam G as will hereinafter appear.

H represents the plunger by means of which the heel is pressed tightly against the fixed abutment 20 after the lifts have been justified by the means hereinafter particularly described. This plunger H comprises the members 38 and 39. The member 38 is threaded and is adjustable lengthwise within the member 39 by means of a nut 40 held by a jam or lock nut 41. This provides for varying the length of the plunger H so as to provide the necessary throw or movement of the plunger in accordance with the thickness of the heels upon which the machine is operating.

The member 39 of the plunger H extends through and projects beyond the inner face 37' of the body 16 of the unit and is provided with an anti-friction roller 42 journaled on a pin 43 carried by the plunger, the said roller 42 being adapted to come into contact with the cam G above referred to. The cam thus serves to drive the plunger H toward the fixed abutment 20 for the purpose of holding the heel under pressure.

The member 38 of the plunger H is provided at its inner end with an enlarged head or presser foot 44 extending from which is a pin 45 having connected thereto one end of a contractile plunger returning spring 46 the opposite extremity of which is attached at 47 to a fixed part of the unit frame or body 16. The member 39 of the plunger H is also provided with ratchet teeth 48 adapted to be engaged by the point of a pawl or detent 49 which is pivotally mounted at 50 on the body 16 of the unit, the detent 49 being thus adapted to hold the plunger in its heel clamping position after it has been thrust toward the fixed abutment 20 by the cam G.

The pawl or detent 49 is further provided with a tripping extension 51 which, at the appropriate time comes into contact with a pawl trip 52 shown in Fig. 2 and connected to and supported by the cam G, being shown as fastened thereto by screws 53 or their equivalent.

Figure 12:
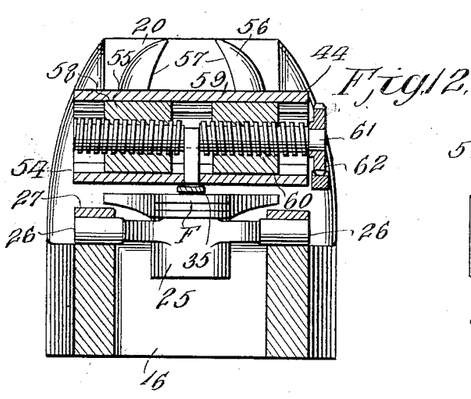
Fig. 12 is a vertical cross section on the line 12—12— on Fig. 4.
Figure 13:
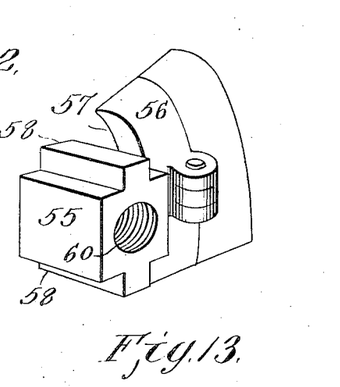
Fig. 13 is a detail perspective view of one of the heel-justifying members.
Figure 14:
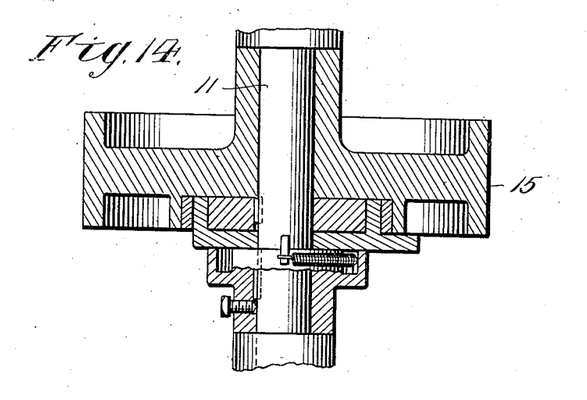
Fig. 14 is a diametrical section through the driving pulley and adjacent parts, illustrating the clutch mechanism.
Figure 15:
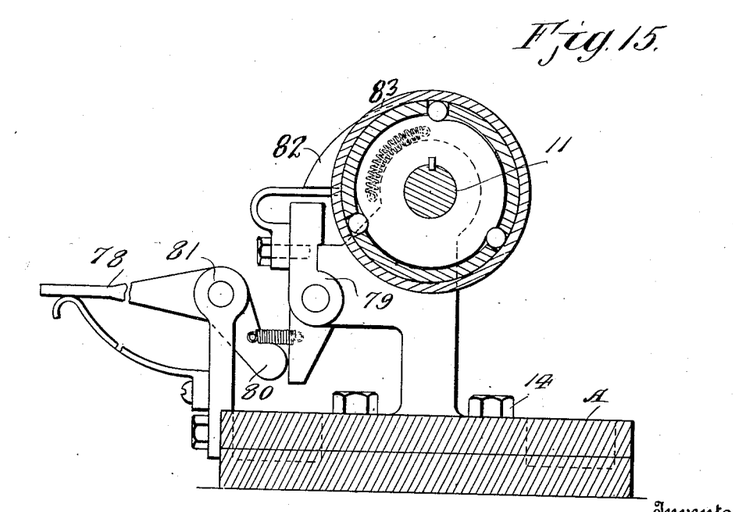
Fig. 15 is a view of the clutch mechanism taken at right angles to Fig. 14 partly in elevation and partly in section.

The plunger head or presser foot 44 is formed with a guide way 54 extending lengthwise thereof, horizontally, and perpendicularly with respect to the path of movement of the plunger H. The guide way 54 is designed to receive the bases 55 of a pair of lift-justifying members 56, two of such members being employed in connection with each unit and being designed to engage the margins or edges of the lifts so as to move all of the lifts into perfect alinement after they have been pasted or cemented together and before the paste or cement becomes set. The shape of the justifying members 56 is clearly illustrated in the sectional view, Fig. 12, wherein it will be seen that each of the justifying members has a concaved inner heel engaging face 57 corresponding in curvature to the curvature of the heel. Each of the bases 55 is provided with the oppositely projecting ribs or extensions 58 which slide back and forth in corresponding portions 59 of the guide way 54 in the plunger head or presser foot 44.

The bases 55 of the heel-justifying members are internally threaded as shown at 60, one being provided with a right hand thread and the other with a left hand thread. In conjunction therewith I employ a feed screw 61 provided at opposite sides of its center with right and left hand screw threads as shown so that when the screw 61 is turned in one direction, the justifying members will be moved toward each other and when said screw is turned in the opposite direction, the justifying members will be moved away from each other. In order to impart movement to the screw 61, said screw has fast on one end thereof an operating gear 62 which meshes with a stationary rack bar 63, said rack bar being held stationary by a rack bar holder 64 connected to the frame of the unit by a cap screw 65 or its equivalent. The holder 64 is provided with a notch 66 to receive the rack bar 63, the latter being held fixed by means of a binding screw 67. By loosening the screw 67, the rack bar 63 may be moved longitudinally for the purpose of primarily adjusting the heel-justifying members 56 so that they will operate on the lifts of the built-up heel and force the same into alinement just before the plunger head presses the heel against the fixed abutment 20.

It will be observed that the heel-justifying members 56 together with their operating screw 61 and the gear 62 are carried by the plunger head and said justifying members are operated by the gear 62 rolling over and meshing with the rack bar 63. As the plunger head 44 moves toward the fixed abutment 20, the justifying members 56 are moved toward each other and in the reverse movement of the plunger head, the justifying members are moved away from each other. After the plunger has been released and allowed to be drawn away from the fixed abutment 20 by means of the spring 46, thereby releasing the heel, the table F is opened by the inward movement of the spreader 35 and the completed heel drops into a receptacle placed beneath. The spreader 35 is retracted or moved back to its inoperative position by means of a retracting spring 68 one end of which is fastened to a fixed part of the body 16 of the unit, the other end being fastened to the spreader 35.

The cam G as shown in Fig. 2 comprises the primary plunger operating projection or face 69 and the secondary plunger operating face 70. The cam also comprises the spreader operating face 71 and the cam as a whole is adjustable axially around the portion 2 of the column by dividing or splitting said cam as indicated at 72 and passing a binding screw 73 through the divided portions of the cam at one side of the spindle or reduced portion 2 of the column. The roller 42 of the plunger first comes into contact with the part 69 of the cam G and is thrust toward the fixed abutment 20. The detent 49 engages the teeth 48 of the plunger and holds the plunger thereafter until the unit referred to has made a nearly complete revolution or sweep around the axis of the machine. Just before a complete revolution is effected, the face 70 of the cam G which is of slightly greater radius than the face 69, acts against the roller 42 to press the plunger H a little farther toward the fixed abutment 20. This relieves the pawl 49 and enables the pawl trip 52 to act on the tripping extension 51 to rock the pawl entirely out of engagement with the teeth 48. Then after the roller 42 passes off the face 70 of the cam, the spring 46 retracts the plunger and not only releases the pressure on the heel between the plunger head and the abutment 20 but also effects a spreading apart of the justifying members 56. The heel is now entirely released but still rests on the table F. The projecting end of the spreader 35 now comes into contact with the face 71 of the cam G, thrusting the wedge-shaped members 36 between the shoulders 34 of the table sections. This opens the table and permits the heel to drop into a receptacle beneath. The unit which has just been emptied then moves to its original filling position and the operator after pasting or cementing together the lifts forming another heel places said heel in the unit just vacated whereupon the operation hereinabove described is repeated.

It will thus be seen that when a composite heel is placed in the machine, it is carried practically through an entire cycle or revolution of the turret head before it is dropped into its receptacle, thus affording ample time for the paste or cement to set, the heel being under pressure the entire time.

Figure 3:
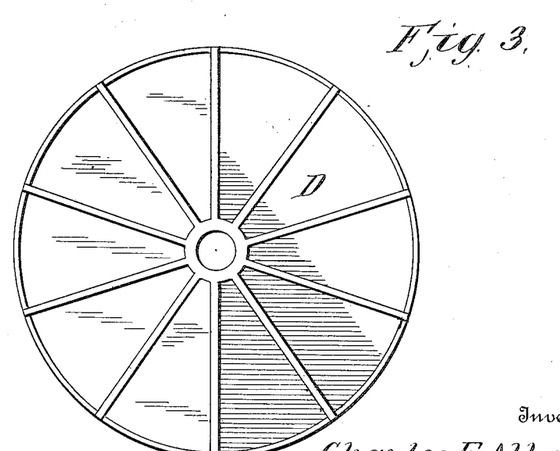
Fig. 3 is a plan view of the lift holder.
Figure 4:
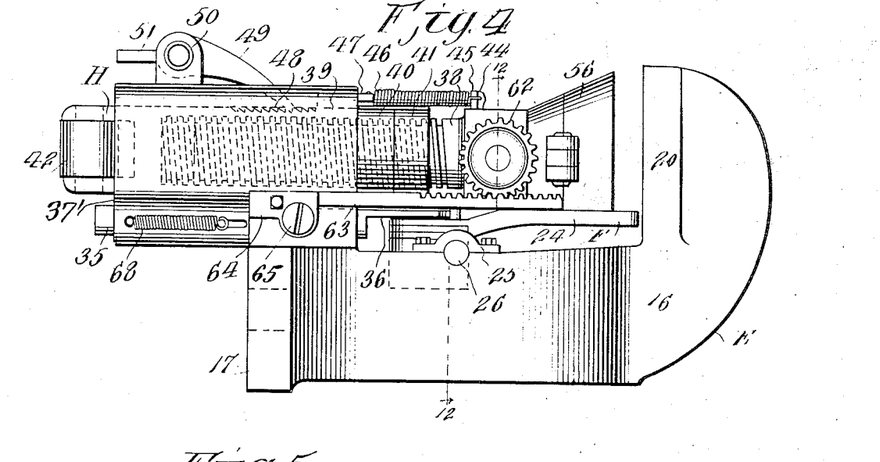
Fig. 4 is a side elevation on an enlarged scale of one of the heel clamps or heel clamping units.

The column B in addition to being reduced as shown at 2 to form a journal for the turret head C is further reduced as shown at 74 to receive the revoluble heel lift holder D hereinabove referred to, the said holder D being adapted to be turned by hand and being entirely free from and independent of the turret head C. The holder D is preferably mounted on upper and lower ball bearings 75 and 76 respectively so that it will turn easily and is held in place by a nut 77 threaded on the upper end of the spindle or reduced portion 74 of the column. The holder D as shown in Fig. 3 is divided into a number of compartments or stalls designed to receive lifts of different sizes which may be readily picked up by the operator without the necessity of reaching all over a bench in accordance with the present practice. The compartments of the holder D may be brought consecutively over the unit waiting to receive the composite heel thus enabling the operator to perform his work fully without moving from his position.

In order to provide for the intermittent rotation of the turret head C, the driving pulley 15 above referred to is normally loose on the shaft 11 but is adapted to take up and revolve the driving shaft 11 by means of a clutch interposed between the pulley 15 and the shaft 11 and thrown into operation by means of a foot operated treadle 78 pivotally mounted at 81. When the operator depresses the treadle 78 the clutch is thrown in by the arm 80 of the treadle, whereupon the shaft 11 turns one complete revolution, thereby imparting a fraction of a revolution to the turret head C. For example, if the turret head comprises twelve units E, the gearing will be designed so that one complete revolution of the driving shaft 11 will cause one-twelfth of the complete revolution of the turret head C. After the clutch just hereinabove referred to has been thrown into action by depressing the treadle 78, it is thrown out of operation upon the completion of one revolution of the shaft 11 by means of a dog 79 struck by a projection 82 having a fixed relation to the shaft 11. The turret head then remains stationary until another unit receives its heel and the treadle 78 is again depressed. The dog 79 is moved out of the path of the projection 82 at the time the clutch is thrown in.

What is claimed is:—

1. In a heel making machine, the combination of a supporting frame, a revoluble turret head thereon, means for revolving said head, a circular series of heel clamps carried by said head and each embodying opposed and relatively movable lift-justifying members and heel-compressing means including a reciprocatory compressing plunger, and plunger-operating means.

2. In a heel making machine, the combination of a supporting frame, a revoluble turret head thereon, means for revolving said head, a circular series of heel clamps carried by said head and each embodying opposed and relatively movable lift-justifying members and heel-compressing means including a reciprocatory compressing plunger, and a cam for operating said plunger.

3. In a heel making machine, the combination of a supporting frame, a revoluble turret head thereon, means for revolving said head, a circular series of heel clamps carried by said head and each embodying opposed and relatively movable and lift-justifying members and heel-compressing means including a reciprocatory compressing plunger, and a stationary cam for operating said plunger.

4. In a heel making machine, the combination of a supporting frame, a revoluble turret head thereon, means for revolving said head, a circular series of heel clamps carried by said head and each embodying opposed and relatively movable lift-justifying members, heel-compressing means including a reciprocatory compressing plunger and an independent detent for holding said plunger in compressing position, and plunger-operating means.

5. In a heel making machine, the combination of a supporting frame, a revoluble turret head thereon, means for revolving said head, a circular series of heel clamps carried by said head and each embodying lift-justifying members, heel-compressing means including a compressing plunger and a detent for holding said plunger in compressing position, plunger-operating means, and means for tripping said detent.

6. In a heel making machine, the combination of a supporting frame, a revoluble turret head thereon, means for revolving said head, and a circular series of heel clamps carried by said head, each embodying a heel table, lift-justifying means, heel-compressing means and means for automatically displacing said table to permit the heel to drop.

7. In a heel making machine, the combination of a supporting frame, a revoluble turret head thereon, means for revolving said head, and a circular series of heel clamps carried by said head, each embodying a heel table, lift-justifying means, heel-compressing means and means for automatically displacing said table to permit the heel to drop.

8. In a heel making machine, the combination of a supporting frame, a revoluble turret head thereon, means for revolving said head, and a circular series of heel clamps carried by said head each embodying a sectional heel table, lift-justifying means, heel-compressing means and means for automatically displacing the sections of said table to permit the heel to drop.

9. In a heel making machine, the combination of a supporting frame, a revoluble turret head thereon, means for revolving said head, and a circular series of heel clamps carried by said head, each embodying a heel table comprising pivoted sections, lift-justifying means, heel-compressing means and means for automatically moving said sections apart to permit the heel to drop.

10. In a heel making machine, the combination of a supporting frame, a revoluble turret head thereon, means for revolving said head, and a circular series of heel clamps carried by said head, each embodying a heel table comprising pivoted sections, lift-justifying means, heel-compressing means, means for automatically moving said sections apart to permit the heel to drop and means for returning the table sections to heel supporting position.

11. In a heel making machine, the combination of a supporting frame, a revoluble turret head thereon, means for revolving said head, and a circular series of heel clamps carried by said head, each embodying a divided heel table comprising jointed sections, lift-justifying and heel-compressing means and a spreader for opening the table sections to permit the heel to drop.

12. In a heel making machine, the combination of a supporting frame, a revoluble turret head thereon, means for revolving said head, and a circular series of heel clamps carried by said head, each embodying a divided heel table comprising jointed sections, lift-justifying and heel-compressing means, a spreader for opening the table sections to permit the heel to drop, said spreader comprising a wedge-shaped member, and shoulders on the table sections between which said wedge-shaped member is movable.

13. In a heel making machine, the combination of a supporting frame, a revoluble turret head thereon, means for revolving said head, and a circular series of heel clamps carried by said head, each embodying a divided heel table comprising jointed sections, lift-justifying and heel-compressing means, a spreader for opening the table sections to permit the heel to drop, said spreader comprising a wedge-shaped member, shoulders on the table sections between which said wedge-shaped member is movable and a spring for closing said table sections.

14. In a heel making machine, the combination of a supporting frame, a revoluble turret head thereon, means for revolving said head, a circular series of heel clamps carried by said head and each embodying a divided heel table comprising jointed sections, lift-justifying and heel-compressing means, a spreader for opening the table sections to permit the heel to drop, said spreader comprising a wedge-shaped member, and shoulders on the table sections between which said wedge-shaped member is movable, and a cam for operating said spreader.

15. In a heel making machine, the combination of a supporting frame, a revoluble turret head thereon, means for revolving said head, a circular series of heel clamps carried by said head and each embodying a divided heel table comprising jointed sections, lift-justifying and heel-compressing means, a spreader for opening the table sections to permit the heel to drop, said spreader comprising a wedge-shaped member, shoulders on the table sections between which said wedge-shaped member is movable and means for retracting said spreader, and a cam for operating said spreader.

16. In a heel making machine, the combination of a supporting frame, a revoluble turret head thereon, means for revolving said head, a circular series of heel clamps carried by said head and each embodying lift-justifying members, heel-compressing means including a compressing plunger, a detent for holding said plunger in compressing position and means for retracting said plunger, plunger-operating means, and means for tripping said detent.

17. In a heel making machine, the combination of a supporting frame, a revoluble turret head thereon, means for revolving said head, and a circular series of heel clamps carried by said head, each embodying a heel table, a heel-compressing plunger and lift-justifying means carried by said plunger.

18. In a heel making machine, the combination of a supporting frame, a revoluble turret head thereon, means for revolving said head, and a circular series of heel clamps carried by said head, each embodying a heel table, a heel-compressing plunger and lift-justifying members carried by said plunger and movable perpendicularly thereto.

19. In a heel making machine, the combination of a supporting frame, a revoluble turret head thereon, means for revolving said head, a circular series of heel clamps carried by said head, each embodying a heel table, a heel-compressing plunger, lift-justifying members carried by said plunger and rack and pinion mechanism for actuating the lift-justifying members, and a centrally arranged cam for actuating said plungers successively.

20. In a heel making machine, the combination of a supporting frame, a revoluble turret head thereon, means for revolving said head, a circular series of heel clamps carried by said head, each embodying a heel table, a heel-compressing plunger, lift-justifying members carried by said plunger and rack and pinion mechanism for actuating the lift-justifying members comprising a feed screw carried by said plunger and engaging the lift-justifying members, a pinion on said screw and a stationary rack bar with which said pinion meshes, and a centrally arranged cam for actuating said plungers successively.

21. In a heel making machine, the combination of a supporting frame, a revoluble turret head thereon, means for revolving said head, a circular series of heel clamps carried by said head, each embodying a heel table, a heel-compressing plunger, lift-justifying members carried by said plunger and means controlled by the movements of said plunger for moving said lift-justifying members toward and away from each other, and a centrally arranged cam for actuating said plungers successively.

22. In a heel making machine, the combination of a supporting frame, a revoluble turret head thereon, means for revolving said head, a centrally arranged stationary cam, and a circular series of heel clamps carried by said head, each embodying a heel-compressing plunger and lift-justifying members carried by said plunger, the plungers of the series of heel-clamps being successively actuated by said cam.

23. In a heel making machine, the combination of a supporting frame, a revoluble turret head thereon, means for revolving said head, a centrally arranged stationary cam, and a circular series of heel clamps carried by said head, each embodying a displaceable heel table, a heel-compressing plunger and a table displacing member, the plungers and table displacing members of the series of heel clamps being successively actuated by said cam.

24. In a heel making machine, the combination of a supporting frame, a revoluble turret head thereon, means for revolving said head, a centrally arranged cam, and a circular series of heel clamps carried by said head, each embodying a heel table, a heel-compressing plunger arranged to be actuated by said cam, lift-justifying members carried by said plunger, and rack and pinion mechanism for actuating the lift-justifying members comprising a feed screw carried by said plunger and engaging the lift-justifying members, a pinion on said screw, a stationary rack bar with which said pinion meshes and means for adjusting said rack longitudinally to regulate the space between the lift-justifying members.

25. In a heel making machine, the combination of a supporting frame, a revoluble turret head thereon, means for revolving said head, a centrally arranged cam, and a circular series of heel clamps carried by said head, each embodying a heel table, a heel-compressing plunger arranged to be actuated by said cam, lift-justifying members carried by said plunger and means for varying the length of said plunger.

26. In a heel making machine, the combination of a centrally arranged stationary cam, and a revoluble turret head comprising a circular series of heel clamps arranged to move around said cam and which embody elements arranged to be successively operated or controlled by said cam, each of said heel clamps comprising a sectional and divided table and cam controlled means for spreading the sections of said table after the respective heel clamp has completed one revolution.

27. In a heel making machine, the combination of a centrally arranged stationary cam, and a revoluble turret head comprising a circular series of heel clamps arranged to move around said cam and which embody elements arranged to be successively operated or controlled by said cam, each of said heel clamps comprising a heel-compressing plunger arranged to be actuated by said cam, said cam having two faces which operate on said plunger at different periods in the revolution of the turret head.

28. In a heel making machine, the combination of a centrally arranged stationary cam, and a revoluble turret head comprising a circular series of heel clamps arranged to move around said cam and which embody elements arranged to be successively operated or controlled by said cam, each of said heel clamps comprising a heel-compressing plunger arranged to be actuated by said cam and lift-justifying means carried by said plunger.

29. In a heel making machine, the combination of a centrally arranged stationary cam, and a revoluble turret head comprising a circular series of heel clamps arranged to move around said cam and which embody elements arranged to be successively operated or controlled by said cam, each of said heel clamps comprising a heel-compressing plunger arranged to be actuated by said cam and lift-justifying means carried by said plunger, said lift-justifying means being controlled in its operation by said plunger.

30. In a heel making machine, a revoluble turret head comprising a circular series of heel clamps, in combination with a lift-holder superimposed above said turret and mounted for independent rotation on the came axis.

31. In a heel making machine, a revoluble turret head comprising a circular series of heel clamps, in combination with a compartmental lift-holder superimposed above said turret and mounted for independent rotation on the same axis.

In testimony whereof I affix my signature in presence of two witnesses.

CHARLES E. ALLARD.

Witnesses:
 ROBERT D. TRASK,
 JOSEPH F. COURTNEY.